United States Patent [19]

Theodorsen

[11] 4,304,021
[45] Dec. 8, 1981

[54] METHOD AND APPARATUS FOR MAKING DISPOSABLE SHOE COVERS

[75] Inventor: Theodore E. Theodorsen, Manhasset, N.Y.

[73] Assignee: Kurt Salmon Associates, Inc., New York, N.Y.

[21] Appl. No.: 56,417

[22] Filed: Jul. 10, 1979

[51] Int. Cl.³ .................... A43B 3/16; A43D 97/00
[52] U.S. Cl. .................... 12/142 R; 12/1 A;
  36/7.1 R; 361/224; 83/697; 156/93; 156/536
[58] Field of Search .................... 12/1 R, 1 A, 142 R,
  12/142 E, 142 EV, 142 K; 36/7.1, 7.3, 1;
  361/223, 224

[56] References Cited

U.S. PATENT DOCUMENTS

3,283,422 11/1966 Nygard .................... 36/1
3,337,770 8/1967 Saraceni et al. .................... 36/7.1 R
3,402,323 9/1968 Longstreth .................... 36/7.1 R

*Primary Examiner*—Patrick D. Lawson
*Attorney, Agent, or Firm*—Curtis, Morris & Safford

[57] ABSTRACT

In a method and apparatus for making disposable shoe covers from a substantially continuous supply of material, the material is moved continuously through a plurality of operating stations wherein two parallel sheets of the material are joined to form a shoe cover. The webs of material are drawn from two supply sources along a parallel path where an elastic band of material is attached to one edge of both webs and are united by glueing and stitching operations. In addition, when desired, a static strip is added as the web moves through the apparatus. After the webs of material have been joined, the apparatus cuts the length of joined webs into discrete lengths to define the individual shoe covers.

21 Claims, 21 Drawing Figures

METHOD AND APPARATUS FOR MAKING DISPOSABLE SHOE COVERS

The present invention relates to the manufacture of disposable shoe covers, and more particularly to a method and apparatus for the continuous and substantially automatic manufacture of such shoe covers.

The ever increasing demands in hospital and clean room environments have promulgated the use of disposable shoe covers. Heretofore, disposable shoe covers have been manufactured by individually assembling each shoe cover. Such a manufacturing technique necessitates a concentrated direct labor cost.

It is an object of the present invention to provide a method and apparatus for automatic manufacture of disposable shoe covers at a low cost.

Another object of the present invention is to provide an automated apparatus for the manufacture of durable disposable shoe covers.

A still further object of the present invention is to provide a method and apparatus for the manufacture of disposable shoe covers by a process which is rapid and substantially continuous.

Yet another object of the present invention is to provide a method and apparatus for the manufacture of disposable shoe covers in which a substantially continuous supply of shoe cover material is treated automatically to form a completed shoe cover which can be supplied directly to a packaging carton or the like.

In accordance with one aspect of the present invention a method and apparatus are provided by which disposable shoe covers are formed from a pair of substantially continuous supply reels of a disposable material, for example, a spun bonded olefin or similar synthetic plastic material, which are drawn into the apparatus in parallel paths. During movement through the apparatus an elastic band of material is united to both the webs of material and the webs are moved through a parallel path where they are joined along selected edges of the webs by suitable stitching and glueing apparatus. The joined webs are then severed in discrete lengths to form a disposable shoe cover which can be placed over the shoe of an individual and held there by the tension of the elastic band. In a preferred embodiment of the present invention a static band or strip is also joined to each formed shoe cover so that the shoe cover can be grounded to avoid buildup of static electricity during its use.

The above, and other objects, features and advantages of the present invention, will be more readily apparent in the following detailed description of an illustrative embodiment thereof, which is to be read in conjunction with the accompanying drawings, wherein:

FIG. 1 is a plan view taken along line 11—11 of FIG. 3;

Figures 1, 4A:
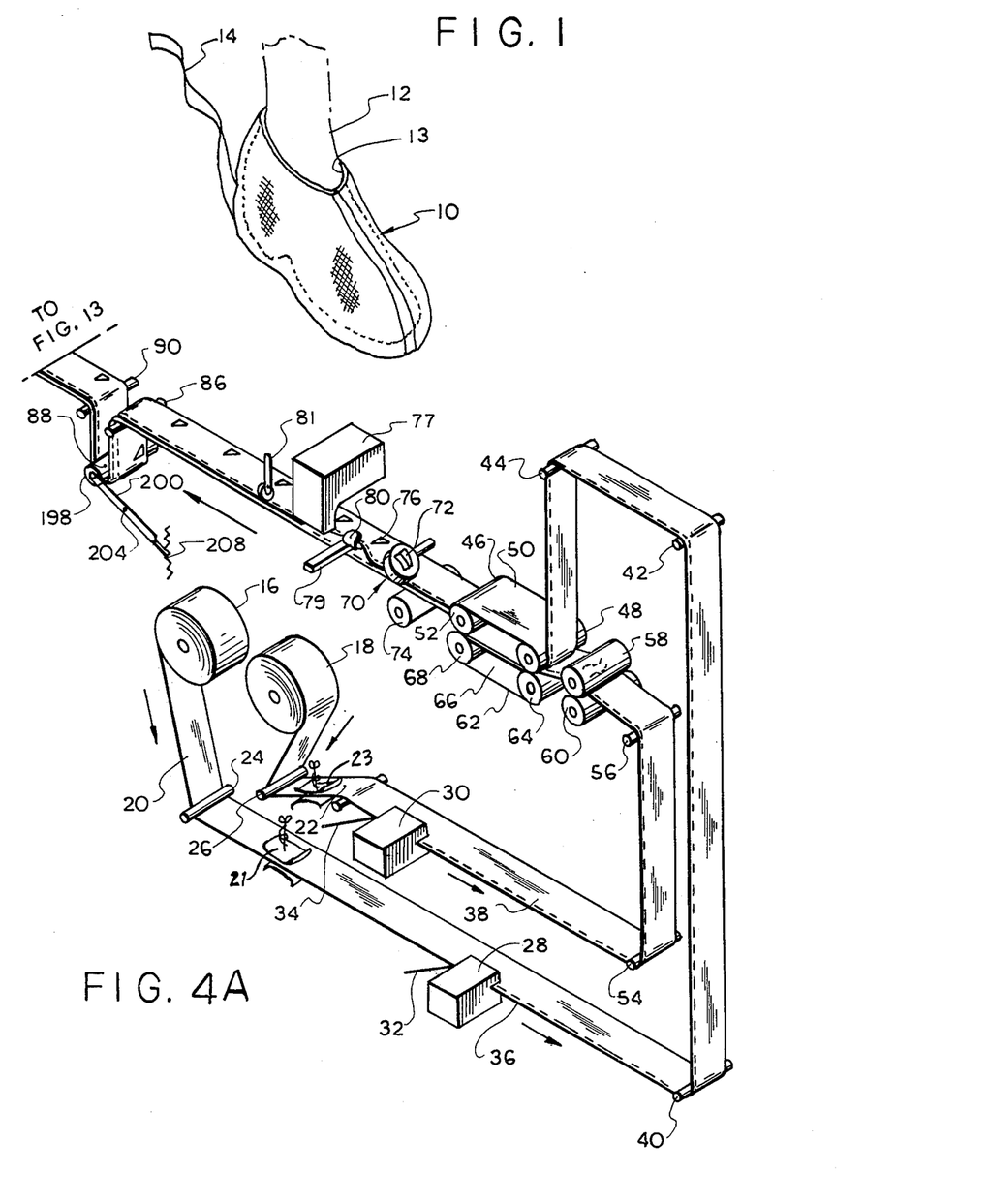
FIG. 1 is a perspective view of a shoe cover formed in accordance with the present invention shown on the foot of a user.
FIG. 4A is a perspective view of one end portion of the apparatus to make a disposable shoe cover of the present invention.
Figures 2, 4B:
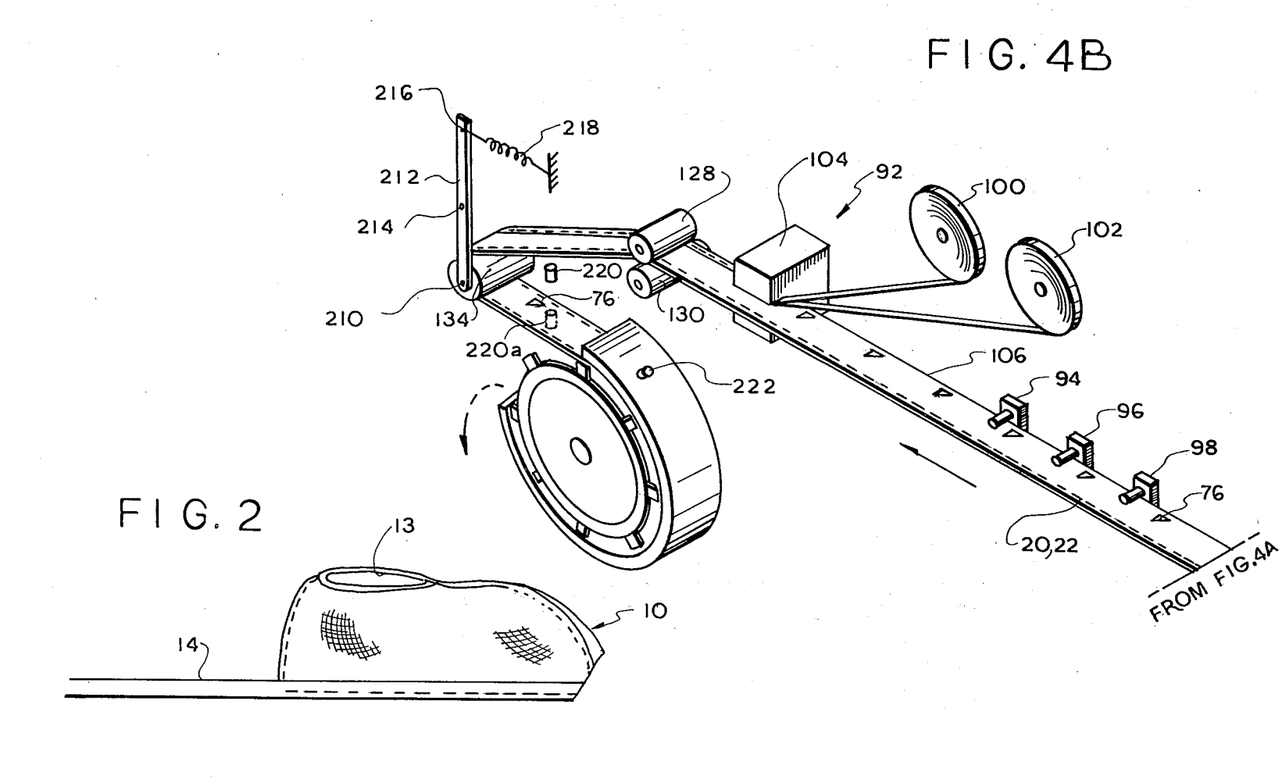
FIG. 2 is a plan view of the shoe cover formed in accordance with the present invention.
FIG. 4B is a perspective view of the remaining portion of the apparatus to make a disposable shoe cover of the present invention.

With reference to the drawings, and initially FIGS. 1 and 2 thereof, there is shown a disposable shoe cover 10 adapted to be slipped on over an individual's shoe 12 through a foot access opening 13. The disposable shoe cover 10 is made from a plastic material such as a spun bonded olefin and is formed according to the apparatus and process of the present invention from two panels of the material which are glued and stitched together with an elastomeric binding, as will be described more fully hereinbelow. In addition, a static strip or band 14 may also be included to be tucked into the individual's shoe or sock to ground any static electricity charges which may build up. This feature is especially desirable where the disposable shoe cover of the present invention is to be used in hospital operating rooms.

Figure 3:
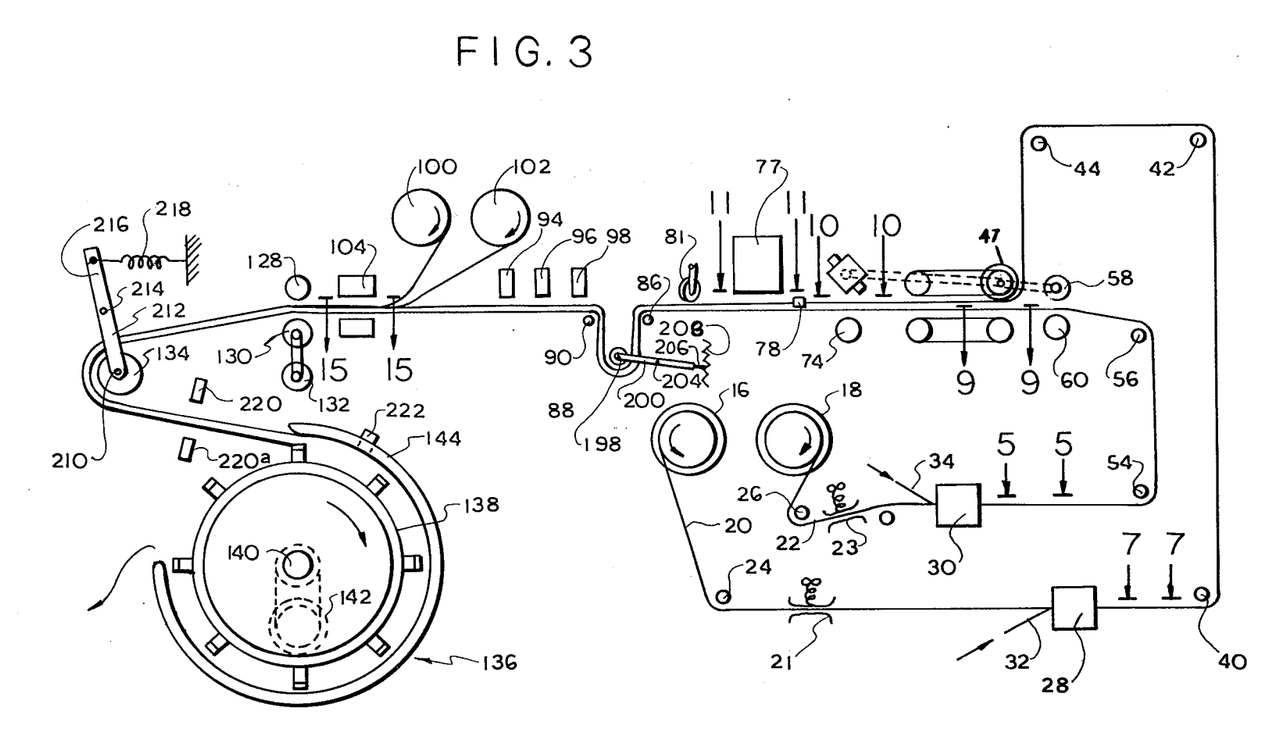
FIG. 3 is an elevational view showing a schematic orientation of the apparatus to make a disposable shoe cover of the present invention.
Figure 5:
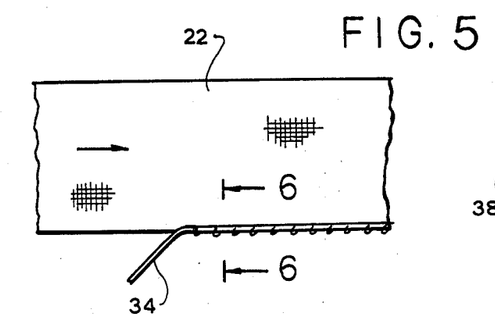
FIG. 5 is a plan view taken along line 5—5 of FIG. 3 showing an initial step of manufacture of the disposable shoe cover of the present invention.
Figure 6:
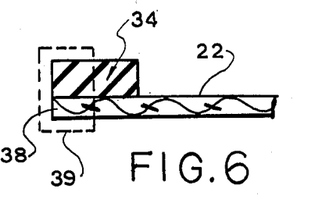
FIG. 6 is a sectional view taken along line 6—6 of FIG. 5.
Figures 7, 8:
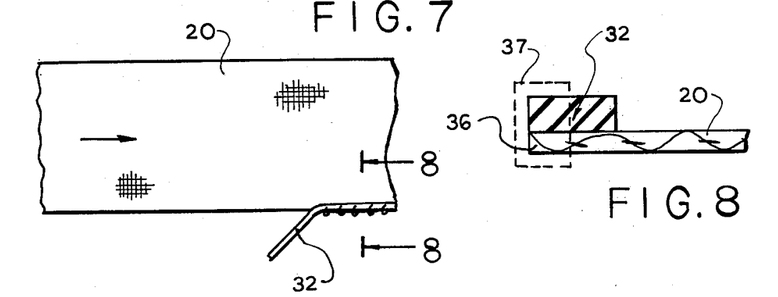
FIG. 7 is a plan view taken alon line 7—7 of FIG. 3 showing an initial manufacturing step according to the present invention.
FIG. 8 is a sectional view taken along line 8—8 of FIG. 7.

Reference is now made to FIG. 3 as well for an overall view of the apparatus and processing sequence of the present invention. As shown, two supply rolls 16 and 18 supply a continuous web of material for the shoe cover. The rolls are rotatably mounted to feed a continuous web 20 and 22, respectively, about an idler roll 24 and 26, respectively, to a first stitching station 28 and 30, respectively. A tensioning device 21 and 23, of any appropriate type known to those skilled in the art, provides a controlled degree of tensioning in the web 20, 22 in order to keep the web relatively flat as it passes into the first stitching station 28, 30. Stations 28 and 30 are identical stations where a continuous band of an elastic material 32 and 34, respectively, from a supply roll (not shown) is fed to and serged to one edge 36 and 38, respectively, of continuous webs 20 and 22, respectively, (as best shown in FIGS. 5-8). As shown in FIGS. 6 and 8, the serged stitch, 37 and 39, respectively, passes through the elastic material, 32 and 34, then through the web, 20 and 22 and finally around the edge, 36 and 38 of the web, 20 and 22.

Figure 9:
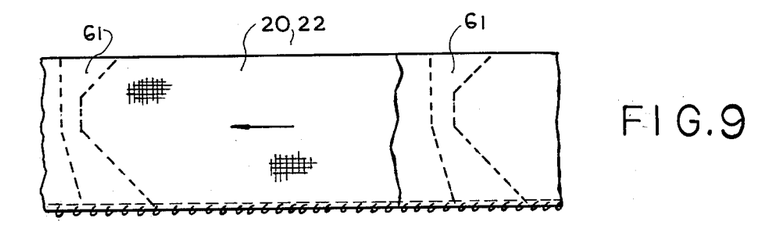
FIG. 9 is a plan view along line 9—9 of FIG. 3.

As best seen in FIG. 4A, web 20 with its continuous strip of serged elastomeric band 36 is then drawn around idler rolls 40, 42 and 44 to belt drive assembly 46. The belt drive assembly 46 includes a compression belt motor 47, motor driven drive roll 48, belt 50 and idler roll 52 and moves web 20 in a horizontal direction along the bed of the apparatus. At the same time, web 22 is moved about idler rolls 54 and 56 and directed in a horizontal path parallel to and spaced below the horizontal path of web 20 along the bed of the apparatus. The web 22 is directed between a hot melt adhesive applicator roll 58 and a backup roll 60 spaced below the applicator roll 58. The hot melt adhesive applicator roll 58 supplies hot melt adhesive to the upper surface of web 22 at spaced intervals defining the juncture between individual shoe covers, i.e., the heel-to-toe seam. The adhesive is applied in a pattern 61 (see FIGS. 9 and 10) which is wider at each edge of the web and which tapers to a uniform lateral strip toward the center. The shoe covers are severed later on in the manufacturing process in the juncture area of the adhesive application. Thus, after the hot melt adhesive is applied at spaced intervals on web 22, web 22 passes over driven belt roll assembly 62 comprising a driven roll 64, a belt 66 and an idler roll 68 which, with drive assembly 46, compresses the lower surface of web 20 and the upper surface of web 22 together to adhesively join the webs at the spaced intervals where the hot melt adhesive has been applied.

Figure 10:
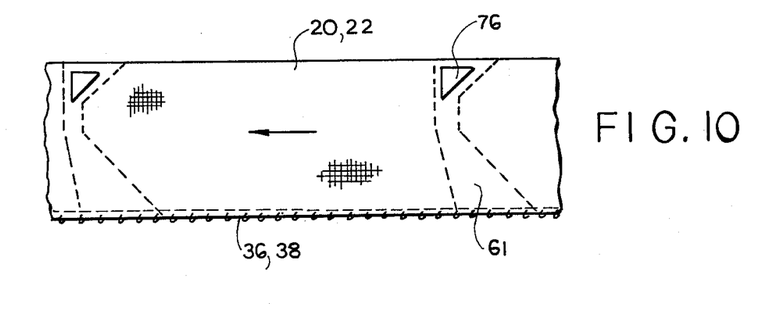
FIG. 10 is a plan view taken along line 10—10 of FIG. 3.

The webs 20 and 22, now joined at spaced intervals by the hot melt adhesive, are directed to a notching station 70 where a rotating notching knife 72 such as a die cut knife or heated assembly acting against a backup roller 74 places a substantially triangularly shaped notch 76 in the joined webs of material in an adhesively joined segment 61, as best seen in FIG. 10.

After the joined webs 20, 22 pass the notching station 70, the edges 36, 38 of webs 20, 22 are joined together by a single needle chain stitch sewing machine 77 positioned on the bed of the apparatus. Sewing machine 77 operates continuously to stitch webs 20 and 22 together as the web is moved past the machine 77. However, since this elasticized edge of the joined webs 20 and 22 ultimately becomes the upper area of the shoe cover 10, provision is made to insure that the portion of the shoe cover 10 which becomes the foot access opening 13 is not stitched together.

Figure 11:
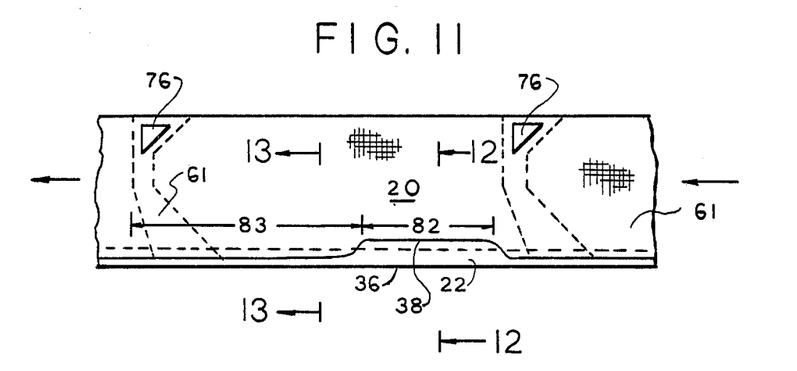
Figure 12:
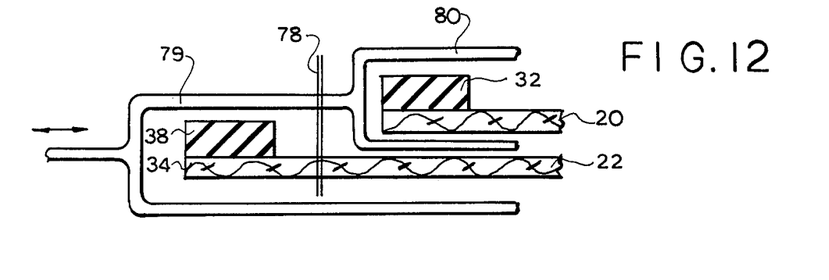
FIG. 12 is a sectional view taken along line 12—12 of FIG. 11.
Figure 13:
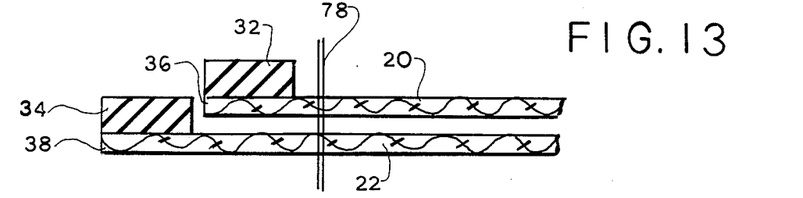
FIG. 13 is a sectional view taken along line 13—13 of FIG. 11.

To this end, webs 20 and 22 are fed into the apparatus so that upper web 20 is laterally offset slightly from lower web 22 as the webs move in their parallel path through the apparatus. In addition, a piston driven reciprocating guide member 79 is provided (see FIGS. 11 and 12 as well) which has an extending fabric grasping foot 80 to contact and push a segment 82 of the upper web 20 away from the stitching needle of sewing machine 77 when the guide member 79 is in the extended position as shown in FIG. 12. Pusher assembly 79 is periodically activated to move segment 82 away from the stitching material in an area of the web immediately in front of and adjacent to an adhesively joined segment 61, as shown in FIG. 11. Thus, stitching machine 77 stitches webs 20 and 22 together along the segment indicated at 83 in FIG. 11 and continues stitching along the edge 36 of web 22 in the segment indicated at 82 without joining web 20 to web 22 along this limited segment. In this manner, the foot access opening 13 is formed without requiring starting and stopping of the stitching machine 77.

As the web 20, 22 passes out of stitching station 77, a rotatable wheel 81 contacts web 20 and assists segment 82 to its former position, i.e., flat against web 22. The wheel 81 is vertically mounted and turned toward the edge 36 such that rotation of wheel 81 "walks" web 20 back into position.

After passing under wheel 81, the joined webs 20, 22 move in a horizontal path alon the bed of the apparatus over an idler roll 86 under a "dancer" roll 88, whose function will be described more fully hereinbelow, and over an idler roll 90 to again resume a horizontal path of travel alon the bed of the apparatus.

After again resuming a horizontal path of travel through the bed of the apparatus (see FIG. 4B), the joined webs of material 20 and 22 pass through a static strip application station 92 which may be activated to add static strips 14 to the shoe covers. The static strip application station 92 includes three electric eyes 94, 96 and 98, respectively, which read the passage of the triangular cutout segment 76 to initiate control signals to operate the respective cut, bypass and insert sequences of the static strip application station 92.

Static strip application station 92 includes a pair of supply rolls 100, 102 rotatably mounted to alternately feed a web of static strip material to a serging sewing machine 104 where the strips are alternately fed and stitched to the edge 106 of the joined webs 20 and 22 opposite edges 36 and 38. Since the static strip 14 on each shoe cover 10 formed according to the process of the present invention extends beyond the heel portion of the shoe cover, provision must be made in the static strip stitching station 92 to insure that the trailing portion of the static strip is not stitched to the joined web of material. Accordingly, as best seen in FIGS. 14 and 15, static strip sewing station 92 includes provision for alternately feeding static strip material from supply roll 100 and 102, sewing a length of the static material together with the edge 106 of webs 20 and 22, then pushing a portion of the strip aside before the trailing portion of the static strip reaches the sewing machine 104 in order to form the trailing portion of the static strip and finally cutting the trailing portion of the static strip when it reaches the desired length.

Figure 14:
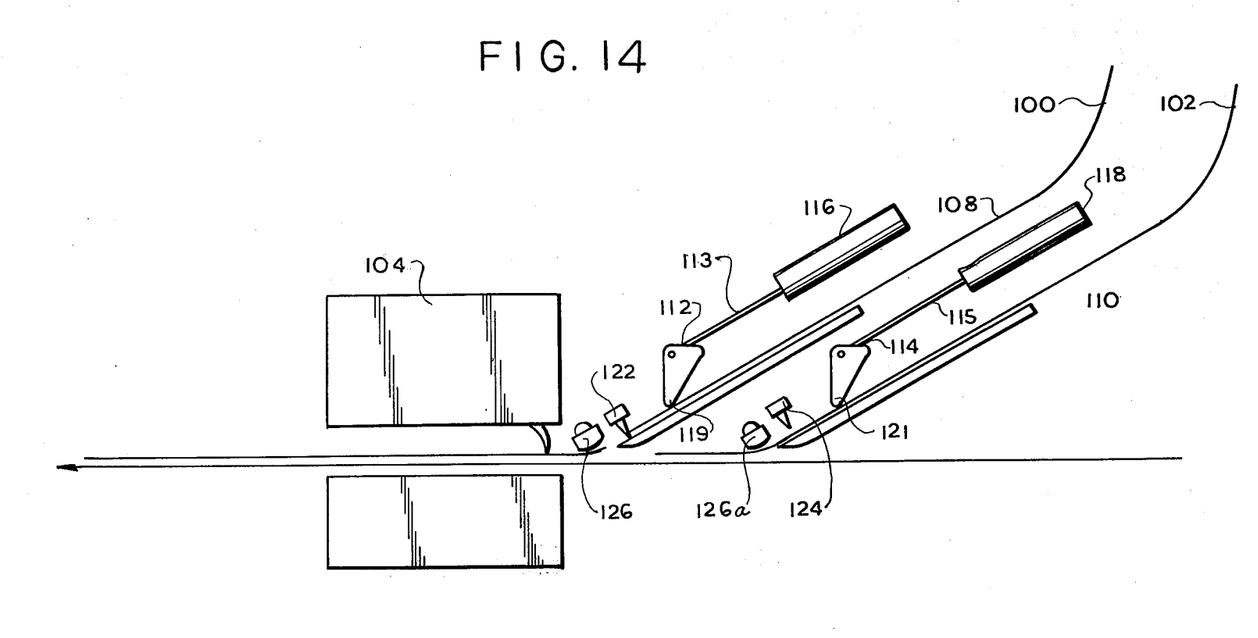
FIG. 14 is a partial elevational view showing a representation of the feeding of the static strip of material to the apparatus for making a disposable shoe cover.
Figure 15:
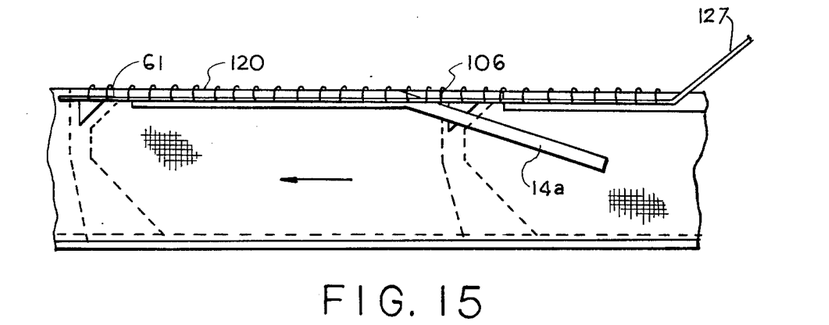
FIG. 15 is a plan view taken along line 15—15 of FIG. 3.
Figure 16:
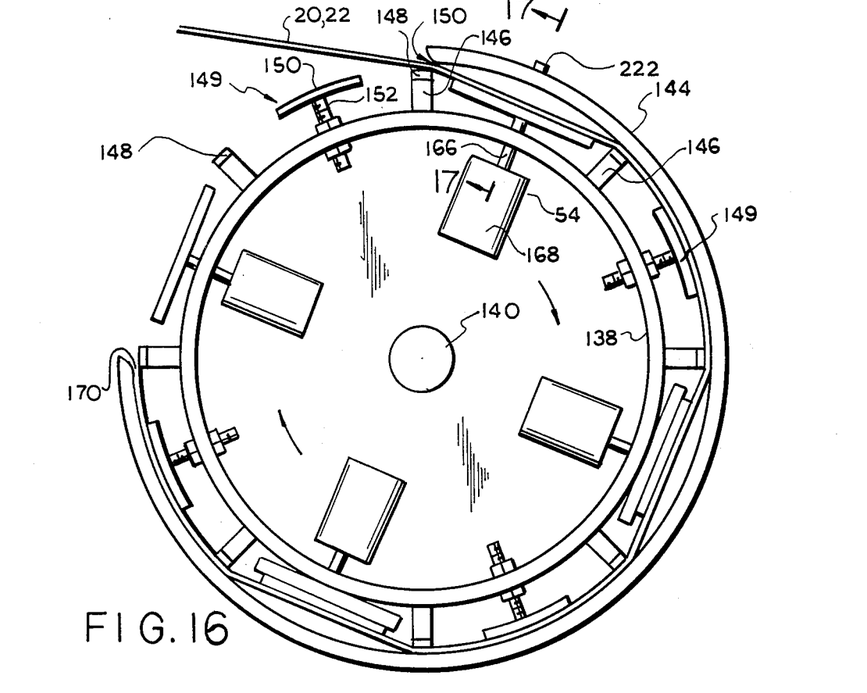
FIG. 16 is an elevational view showing the severing drum to sever the web of continuous material into discrete shoe cover members according to the present invention.
Figure 17:
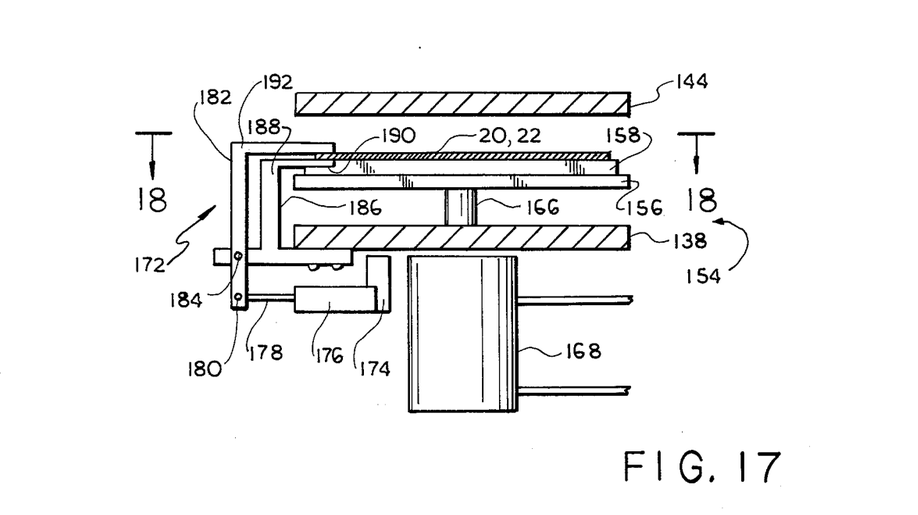
FIG. 17 is a sectional view taken along line 17—17 of FIG. 16.
Figure 18:
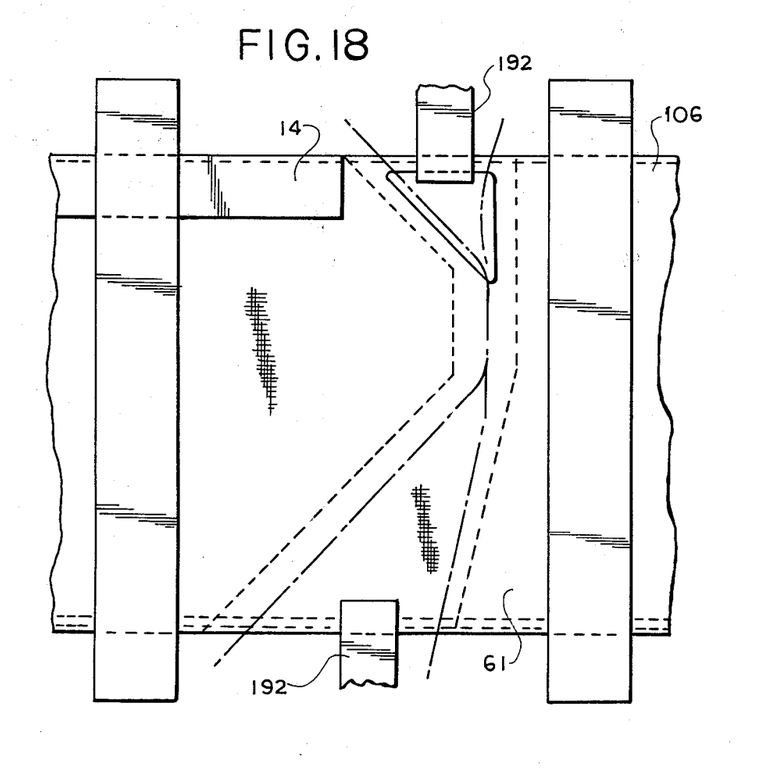
FIG. 18 is a sectional view taken along line 18—18 of FIG. 17.
Figures 19, 20:
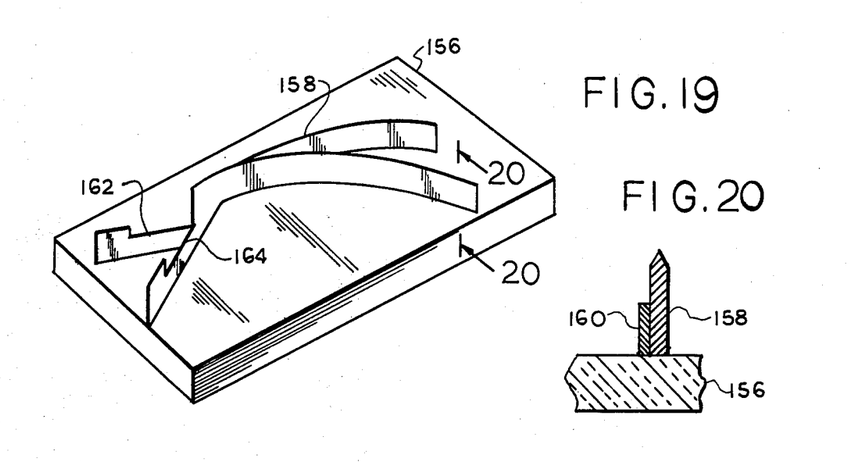
FIG. 19 is a perspective view showing a detail of the severing mechanisms.
FIG. 20 is a sectional view taken along line 20—20 of FIG. 19.

Thus, as shown in FIG. 14, the static strip materials from rolls 100 and 102 are each drawn to respective slide supports 108 and 110. Each slide support has associated with it a reciprocating feed shoe 112, 114, respectively, pivoted on an arm 113, 115, respectively, which is reciprocated by a pneumatically actuated cylinder 116, 118. Upon alternately extending the arm 113, 115, the edge 119, 121, respectively, of the feed shoe 112, 114 is wedged into the static strip material and feeds static strip material alternately from each roll 100, 102. Actuation of pneumatic cylinders 116 and 118 are controlled by electric eye 94 (FIG. 4B) which senses the passage of cutout 76. Thus, on a signal generated by electric eye 94 a static strip from roll 100 is inserted by feed member 112 onto the moving web of material at a position on the web just after the adhesively secured segment 61 (see FIG. 15). The static strip is also fed onto the moving web such that both the static strip and web are inserted under the stitching needle of sewing machine 104. Sewing machine 104, which operates continuously, serges the static strip segment 14 to the moving web of material along the length 120 indicated in FIG. 15 between adjacent adhesively joined segments 61. This stitching operation not only serges the static material to the moving web of material, but also serges the material together along edge 106 and serges an additional continuous elastic band 127 to edge 106. On a signal generated by electric eye 96, a bypass assembly 126, 126a shown in FIG. 14, which may also be pneumatically actuated, is extended to push the strip of the static material 14 which extends beyond its respective glued segment 61 aside so that this portion of the strip, indicated at 14a in FIG. 15, is not stitched to the web of material immediately behind. A reciprocating knife 122 and 124, respectively, is actuated to sever the end of static strip 14a upon a signal generated by electric eye 98. At the same time that the bypass assembly 126 is pushing aside the strip of material from supply roll 100, the sequence is repeated with the second static strip being inserted from supply roll 102 onto the moving web at a position on the web just after the next adhesively secured segment. The sequence follows with the second static strip being pushed aside by bypass assembly 126a and finally being cut by reciprocating knife 124. Thus, strips are alternately supplied from the two supply rolls.

The elastic band 127 (see FIG. 15) serged along the full extent of edge 106 of the moving web, is fed from a supply roll (not shown). The elastic band 127, together with elastic bads 32 and 34 provide the shoe cover with a degree of elasticity which insures a snug fit over an individual's shoe.

Adjacent the static strip station 92 are the master driving rolls or nip rollers 128, 130 driven by master control motor 132. Motor 132 controls passage of the webs through the driving rolls 128 and 130 which frictionally grip the web of material therebetween.

After passing through the driving rolls 128, 130 the joined web of material passes around a "dancer" idler roll 134, which will be explained more fully hereinbelow, to a severing station 136 where the web of material is severed through each adhesively joined segment 61 to form the individual shoe cover elements.

The severing station 136 (see FIGS. 3, 4b and 16–20) includes a drum member 138 rotatably mounted on an axle 140 and adapted to be driven in a clockwise direction as viewed in FIG. 3 by a motor 142. A stationary guide shell 144 is fixed about rotating drum member 138 concentric to and spaced from the outer diameter of drum 138. Guide shell 144 extends about drum 138 in an arc of about 270°. Spaced about the periphery of drum 138 are eight circumferentially spaced radially extending feet 146 having rubber or rubber-like material contacting ends 148 thereon.

The fabric web 20, 22 is fed to the open segment 150 of guide 144 and is contacted by the rubber contacting surface 148 of an extending foot 146 to press the fabric web against the interior surface of the guide 144. Thus as drum 138 rotates, the fabric web is pulled along the interior surface of guide 144 which may be polished or coated with a low friction material so that the web may readily slide along the interior surface of the guide 144. Preferably, the rubber contacting surface 148 of each extending foot member 146 is slightly spring loaded and exerts a radially outward force against the web of material to insure that t is firmly pressed against the interior of the guide 144.

A shim plate assembly 149 is also provided between alternate pairs of extending feet 146. Shim plate assembly 149 includes a fabric web contacting plate 151 having an arcuate shape with a radius of curvature substantially identical to the radius of the guide 144. Each plate 151 is mounted on an adjusting screw member 152 so that its radial extent from the surface of drum 138 may be adjusted. The plate 151 serves to incrementally adjust between alternate pairs of foot members, the arc made by the web within the shell guide 144 and thus adjusts the length of the web 20, 22 between adjacent cutting blades.

Between the other alternate pairs of extending foot members 146 are provided four severing assemblies 154 which each include a carrier plate 156 (see FIG. 19) of an asbestos material on which is mounted a heat conducting knife edge blade assembly 158. Adjacent to blade 158 is an electrical strip heater 160 (see FIG. 20) to heat blade assembly 158 so that when the blade is placed in contact with the fabric web 20, 22 the heated blade passes through the fabric material severing the web into the discrete shoe cover members. Blade 158 is configured to fit into the adhesively joined area 61 of the web as indicated by the broken line in FIG. 18, so that a severing cut between adjacent shoe cover members in the web 20 and 22 provides a rounded cut, corresponding to the toe of the formed shoe cover in one of the adjacent shoe cover members and a more straight cut in the next adjacent formed shoe cover corresponding to the heel of the shoe cover. Knife blade assembly 158 is also notched as at 162 and 164 so that when the blade is pressed against the fabric the free trailing edge 14a of the static strip 14 is not contacted and severed by the heated severing blade.

The severing assembly 154 is carried on a radially reciprocating rod 166 which selectively reciprocates under the action of a pneumatic cylinder 168. Activation of cylinder 168 can be achieved in any convenient manner, for example, electrically under a timed sequence or by a camming action as drum 138 rotates. The severing operation occurs after the fabric web 20, 22 is within the confines of the guide 144 and is firmly gripped by the extending feet 146. At this juncture in the rotation of the drum 138 cylinder 168 is activated forcing the heated blade against the tensioned fabric material web allowing the heated knife to penetrate through the fabric web severing the continuous web into the discrete shoe cover members which are then discharged from the open end 170 of the slide 144.

Because of the configuration of the blade assembly 158 the excess fabric material between the extending legs of the blade 158 must be held securely to obtain a clean and effective cut. This holding mechanism is shown as assembly 172 (see FIG. 17). Assembly 172 includes a bracket 174 supporting a pneumatic cylinder 176 havng an extending reciprocating rod 178 pivotally linked, at 180, to an L-shaped grip member 182. Grip member 182 is pivotally connected, as at 184, to a bracket 186 secured to the interior surface of the drum 138. Bracket 186 includes an L-shaped extension 188 having a leg 190 extending beneath an edge of the fabric 10, 22. Grip member 182 also has a leg 192 extending parallel to and spaced from leg 190 and extends above the fabric web 20, 22. Upon selective actuation of piston 176 grip member 182 pivots into the position shown in FIG. 17 to positively grip the portion of the adhesively bonded segment 61 of the fabric web lying between the legs of the blade assembly 158. Thus upon severing of the web by the heated blade assembly the severed triangular strip of material is retained by the gripper assembly. After drum 138 has rotated, cylinder 176 is again actuated withdrawing leg 192 from contact with the severed triangular strip of material and releasing the severed material so that it may fall clear of the rotating drum or may be removed by a vacuum suction after the severing operation has been completed.

The "dancer" rollers 88 and 134 serve as tension and vernier speed controls to assure synchronous and constantly tensioned movement of the webs of material through the apparatus. As noted, three motors 48, 132 and 142 are used in the apparatus with motor 132 being the master control motor. Motor 48 drives the compression belt drive assembly 46, the hot melt adhesive applicator roll 58 an the notching station 70. "Dancer" roller 88 synchronizes the speed of the belt drive motor 47 to the master control motor 132. If the compression belt drive motor 47 operates too slowly, the web is drawn faster by the master control motor than it is fed by the compression belt drive motor 47. Conversely, if compression belt drive motor 47 operates at a higher rate of speed than master drive motor 132, the web of material would be drawn slower by the master control motor 132 than it is fed by the compression belt drive motor 47.

To synchronize the speed of the compression belt motor 47 with master control motor 131, "dancer" roller 88 (see FIGS. 3 and 4a) is rotatably mounted at one end 198 of an arm 200 which is pivotally mounted at a point, such as 204. The pivoting action of arm 200 around pivot 204 causes the other end 206 of arm 200 to rotate. The movement of end 206 actuates a rheostat control 208 which triggers a control signal to cause the compression belt motor 47 to either slow down or speed up the operation of compression belt assembly 46. In operation, if the compression belt motor 47 runs too fast, more of the material web 20, 22 is pushed from the compression belt assembly 46 than is drawn through nip rollers 128, 130 by master control motor 132. The result is that "dancer" roller 88 moves downwardly rotating the end 198 of arm 200 downwardly which in turn pivots arm 200 around pivot 204 to rotate end 206 upwardly. The upward movement of end 206 activates the rheostat control 208 to trigger a control signal which slows down the compression belt motor 47. This results in the compression belt assembly feeding the material web 20, 22 at a slower rate.

In a like manner, if the compression belt motor 47 is moving too slowly, more material web 20, 22 is drawn through the nip rollers 128, 130 by master control motor 132 than is pushed from the compression belt assembly 46 by compression belt motor 47. The result is the "dancer" roller 88 moves upwardly rotating the end 198 of arm 200 upwardly which in turn pivots arm 200 around pivot 204 and downwardly rotates end 206 of arm 200. The downward motion of end 206 activates rheostat control 208 to trigger a control signal which speeds up compression belt motor 47. Thus the compression belt assembly feeds the material web 20, 22 more quickly.

Thus, by controlling the up and down movement of the "dancer" roller 88 so as to obtain a stationary "neutral" position for the roller 88, the movement of the web 20, 22 through the compression belt assembly 46 and the nip rollers 128, 130 is synchronized.

In order to control the amount of tension on the web between nip rollers 128, 130 and the compresson belt assembly 46, the weight of "dancer" roller 88 may be adjusted.

"Dancer" roller 134 also controls and synchronizes movement of webs 20, 22 by controlling the tension on web 20, 22. To accomplish this control function "dancer" roller 134 is pivotally supported at one end 210 of an arm 212 (see FIGS. 3 and 4b) pivoted at its center, as at 214, to the frame of the apparatus (not shown). The other end 216 of arm 212 is connected by a spring 218 to the frame of the apparatus so that roller 134 is urged to pivot to the left as viewed in FIG. 3 to impart tension on the web 20, 22 passing over the roller.

Under normal conditions the puller-cutter motor 142 pulls the material web 20, 22 into the severing station 136 at the same rate as the master control motor 132 feed the web through nip roller 128, 130.

The web of material 20, 22 fed to the severing station 136 must be properly positioned for the severing blade 158 to sever the web 20, 22 within the adhesively joined segment 61. In order to achieve this, an electric eye assembly 220, 220a is located at a point just before the web enters the severing station 136 and a proximity sensor 222 is located within the shell guide 144 at a point which is located one shoe cover length from the electric eye assembly 220, 220a. As the cutout 76 of the web passes between the electric eye assembly 220, 220a, a first signal is produced. As a severing blade 158 passes by the proximity sensor 222, a second signal is produced. By synchronizing the first and second signals the web of material 20, 22 is properly positioned to insure that the severing blade severs the web 20, 22 within the adhesively joined segment 61.

If the severing blade 158 severs the web 20, 22 behind the adhesively joined segment 61 of the web, the coordinated signals from the electric eye 220, 220a and the proximity sensor 222 indicate that the web is advancing too far into the severing station 136. In this case, by slightly increasing the speed of the puller-cutter motor 142, "dancer" roller 134 is urged further against the bias of spring 218 thus increasing the tension in the fabric web 20, 22 and stretching the web 20, 22 slightly. The slight stretching slows down the speed of the web relative to the severing blade 158 and may be controlled to properly position the cut made in the web 20, 22 by the severing blade.

In a like manner, if the severing blade 158 severs the web in front of the adhesively joined segment 61 of the web, the sensors 220, 220a and 222 indicate that the web is not advancing far enough into the severing station 136 before it is being cut by severing blade 158. Thus, by slightly decreasing the speed of puller-cutter motor 142, the tension on the fabric web is decreased slightly. This acts to slightly decrease the fabric length and increase the speed of the web relative to severing blade 158. By controlling the decrease in web length, the position of the cut in web 20, 22 may be controlled.

The operation of varying the tension is repeated until the proper orientation is again sensed by the electric eye assembly 220, 220a and proximity sensor 222.

Reference is again made to FIGS. 16 and 17 and for ease of description the operation of the severing station 136 will be described briefly in terms of a clock face. The web 20, 22 enters the severing station 136 at about 12 oc'clock and is grasped by an extending foot 146 and a grip member 182. At about 1 o'clock, the heated blade assembly 158 extends to contact the web 20, 22 but does not contact the guide 144. The heated blade assembly 158 remains in contact with the tensioned web 20, 22 until about 4 o'clock. At this point, the blade has severed the web into a shoe cover and the blade assembly 158 is retracted. The severed web is held by the grip member 182 until about 7 o'clock where the severed web is released. The extending foot 146, still in contact with the shoe cover, pulls the shoe cover along the guide 144 until about 8 o'clock where the guide 144 ends and the shoe cover falls out of the severing station 136.

It is thus seen that the present invention provides a method and apparatus for continuously and automatically forming disposable shoe covers in a more or less continuous manner without requiring any high incidence of direct labor in the manufacturing process.

What is claimed is:

1. An apparatus for continuous and automatic manufacture of shoe cover members comprising:
   supply means for supplying two continuous webs of a material,
   means for advancing each of said webs of material through said apparatus,
   means for sewing a continuous band of an elastic material along one lateral edge of at least one of said continuous webs of fabric material as said web moves though said apparatus,
   means for selectively applying an adhesive to at least one of said webs of material at discrete longitudinally spaced increments as said web moves through said apparatus,
   means for directing said webs of material into close parallel paths of movement through said apparatus,
   means for pressing said webs together as said webs move through said apparatus to adhere said webs together at said discrete longitudinally spaced increments,
   means for joining said webs together along the length of the first of the lateral edges thereof and along selected portions of the length of the second of the lateral edges thereof, and
   means for severing said joined webs of material at said longitudinally spaced adhesively joined segment to form individual fabric disposable shoe cover members.

2. The apparatus as defined in claim 1 wherein said means for joining comprises a first joining station including a first sewing means for continuously sewing said webs together along the first lateral edge thereof and a second joining station including a second sewing means for sewing said webs together along the second lateral edge thereof at discrete intervals to provide an access opening in said joined webs corresponding to a front access opening in the shoe cover formed by said apparatus.

3. The apparatus as defined in claim 2 wherein said second joining station includes a continuously operating sewing means positioned for continuously sewing said second lateral edge of said webs and selectively operable means for moving one of said webs out of the path of said second sewing means thereby to preclude sewing of said one web to the other web to form said foot access opening.

4. The apparatus as defined in claim 1 wherein said means for advancing said webs through said apparatus includes a first motor driving a roller against said webs and an idler roller and said means for pressing said webs together after application of said adhesive includes a roll means driven by a second motor acting against an idler roll means.

5. The apparatus as defined in claim 4 including means to synchronize the speed of said second motor driving said roll means to the speed of said first motor to insure that uniform speed of motion is imparted to said webs as they are driven through said apparatus.

6. The apparatus as defined in claim 5 wherein said means to synchronize the speed of said second motor to the speed of said first motor includes a movable tension roll means for compensating for any speed difference between said first and second motors, said tension roll means being disposed within the path of movement of said web through said apparatus, and said tension roll means being provided with speed control means for said second motor adapted to vary the speed of said second motor corresponding to the movement of said tension roll.

7. The apparatus as defined in claim 1 including means for adding a band of static material to one lateral edge of said webs of material, said band having an extended length exceeding the incremental distance between adjacent areas of adhesively joined segments of said webs, comprising means for alternately feeding static material from one of two continuous supplies of said material to one of said means for sewing said webs of materials together thereby sewing a portion of said material to said webs along one lateral edge as said webs are sewed together and means for severing said material from said supplies after said material is sewn to said webs and when the material has reached a discrete length.

8. The apparatus as defined in claim 7 including control means for controlling the alternate feed and severing of said bands of static material comprising means for forming a cutout in said webs within the area of adhesive joinder, means for sensing the passage of said cutout as said webs move through said apparatus and means responsive to the sensed passage of said cutouts for initiating the alternate feeding to said sewing station and severing of said bands of material from said supplies of said material.

9. The apparatus as defined in claim 8 including means responsive to the sensed passage of said cutout to displace a portion of said bands of material which extends beyond an adhesively joined segment of said webs from the path of said sewing operation thereby to insure that said extending segment of said band of material is not sewn to the next adjacent segment of said webs of material.

10. The apparatus as defined in claim 1 wherein said means to sever said joined webs of material through said adhesively joined segments includes a rotating drum member carrying a plurality of radially reciprocating cutting members, means to rotate said drum, a fixed support means spaced outwardly from and concentric with said rotating drum through a substantial portion of the circumferential extent of said drum, means associated with said drum for contacting said webs as said webs are fed through said apparatus and for pressing said webs against said fixed support means whereby said webs are driven by said drum about a substantially circular path of travel against said fixed support means and means for selectively moving said cutting members radially outwardly to sever said webs through said adhesively joined segment.

11. The apparatus as defined in claim 10 wherein said cutting members are heated knife blade members which sever said webs by heat action when said knife blade members are brought into contact with said webs.

12. The apparatus as defined in claim 10 including web tension control means disposed within the path of movement of said webs to control the tension on said webs before said webs are fed to said severing means for controlling the orientation of said webs in said severing means to insure that said knife blade means severs said webs through each said adhesively joined segment of said webs.

13. A method for forming individual disposable shoe covers comprising:

moving a web of fabric material from two continuous sources of supply, sewing a continuous band of an elastic material along a first lateral edge of each web of fabric material, applying an adhesive at discrete space increments to at least one of said webs of fabric material along the width of the web between the first lateral edge and a second lateral edge of the web and directing said webs into a close parallel path of movement to adhere said webs together in an adhesively joined segment at discrete spaced intervals, sewing said first lateral edges of said joined webs together along a discrete length thereof which is less than the length beteeen adjacent adhesively joined segments to define an opening at said first lateral edge between said webs of fabric material, sewing a second lateral edge of said joined webs together along the length thereof which is at least the length between adjacent adhesively joined segments, severing said joined webs of material within said adhesively joined segments to form individual fabric shoe cover members.

14. A method as defined in claim 13 including the step of sewing an elastic band along said second lateral edge of said webs while said other lateral edge is being joined together.

15. A method as defined in claim 13 including the step of sewing a band of static strip material having a length greater than the length between adjacent adhesively joined segments of said webs along the length of said webs between said adhesively joined segments such that a length of said band of static strip material extends beyond an adhesively joined segment of said webs.

16. A method as defined in claim 15 including the steps of displacing said extending strip of static material out of the path of said sewing operation for said other lateral edge to preclude its attachment to the next adjacent length of said webs between the next adjacent adhesively joined segments.

17. A method as defined in claim 13 wherein said severing step includes cutting said joined fabric webs through said adhesively joined segments with a hot knife cutter.

18. In an apparatus for manufacturing of fabric disposable shoe covers formed by joining together two continuous webs of fabric, a severing apparatus for severing the joined continuous webs into individual shoe covers comprising a rotating drum member carrying a plurality of radially reciprocating cutting members, means to rotate said drum, a fixed support means spaced outwardly from and concentric with said rotating drum through a substantial portion of the circumferential extent of said drum, means associated with said drum for contacting said webs as said webs are fed through said manufacturing apparatus and for pressing said webs against said fixed support means whereby said webs are driven by said drum about a substantially circular path of travel against said fixed support means, and means for selectively moving said cutting members radially outwardly to sever said webs through said joined webs to form the shoe covers.

19. The apparatus as defined in claim 18 wherein said cutting members are heated knife blade members which sever said webs by heat action when said knife blade members are brought into contact with said webs.

20. An apparatus for continuous and automatic manufacture of a web adapted to be severed to form shoe cover members comprising:

supply means for supplying two continuous webs of a material, means for advancing each of said webs of material through said apparatus, means for sewing a continuous band of an elastic material along one lateral edge of at least one of said continuous webs of fabric material as said web moves though said appartus, means for selectively applying an adhesive to at least one of said webs of material at discrete longitudinally spaced increments as said web moves through said apparatus, means for directing said webs of material into close parallel paths of movement through said apparatus, means for pressing said webs together as said webs move through said apparatus to adhere said webs together at said discrete longitudinally spaced increments, an means for joining said webs together along the length of the first of the lateral edges thereof and along selected portions of the length of the second of the lateral edges thereof to form joined webs which are adapted to be severed at said longitudinally spaced adhesively joined segments to form individual fabric disposable shoe cover members.

21. A method for forming a continuous web adapted to be severed to form individual disposable shoe covers comprising:

moving a web of fabric material from two continuous sources of supply, sewing a continuous band of an elastic material along a first lateral edge of each web of fabric material, applying an adhesive at discrete space increments to at least one of said webs of fabric material along the width of the web between the first lateral edge and a second lateral edge of the web and directing said webs into a close parallel path of movement to adhere said webs together in an adhesively joined segment at discrete spaced intervals, sewing said first lateral edges of said joined webs together along a discrete length thereof which is less than the length between adjacent adhesively joined segments to define an opening at said first lateral edge between said webs of fabric material, sewing a second lateral edge of said joined webs together along the length thereof which is at least the length between adjacent adhesively joined segments to form joined webs of material which are adapted to be severed within said adhesively joined segments to form individual fabric shoe cover members.

* * * * *